United States Patent
Natori

(10) Patent No.: US 12,483,681 B2
(45) Date of Patent: Nov. 25, 2025

(54) ABNORMALITY DETERMINATION METHOD, CONTROL DEVICE, AND NON-TRANSITORY COMPUTER-READABLE STORAGE MEDIUM STORING PROGRAM

(71) Applicant: SEIKO EPSON CORPORATION, Tokyo (JP)

(72) Inventor: Takashi Natori, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 82 days.

(21) Appl. No.: 18/512,101

(22) Filed: Nov. 17, 2023

(65) Prior Publication Data

US 2024/0171717 A1 May 23, 2024

(30) Foreign Application Priority Data

Nov. 17, 2022 (JP) .................................. 2022-183939

(51) Int. Cl.
*H04N 9/31* (2006.01)

(52) U.S. Cl.
CPC ......... *H04N 9/3191* (2013.01); *H04N 9/3108* (2013.01)

(58) Field of Classification Search
CPC .. H04N 9/3191; H04N 9/3108; H04N 9/3144; H04N 9/3194; H04N 9/3147
See application file for complete search history.

(56) References Cited

U.S. PATENT DOCUMENTS

| | | | |
|---|---|---|---|
| 5,396,257 A * | 3/1995 | Someya | G09G 5/395 345/20 |
| 6,292,157 B1 * | 9/2001 | Greene | H04N 9/12 345/1.3 |
| 2002/0041364 A1 * | 4/2002 | Ioka | G03B 21/005 353/69 |
| 2005/0062897 A1 * | 3/2005 | Lei | H04N 9/73 348/E5.073 |
| 2006/0012759 A1 * | 1/2006 | Matsushita | G03B 21/14 348/E5.074 |
| 2017/0214897 A1 | 7/2017 | Kado | |
| 2022/0070421 A1 * | 3/2022 | Nagata | G09G 5/38 |

FOREIGN PATENT DOCUMENTS

| | | | |
|---|---|---|---|
| JP | 04117785 A | * | 4/1992 |
| JP | 07284120 A | * | 10/1995 |
| JP | 2007-108205 A | | 4/2007 |
| JP | 2008-170522 A | | 7/2008 |
| JP | 2017-134112 A | | 8/2017 |
| JP | 2020-153930 A | | 9/2020 |

* cited by examiner

Primary Examiner — Michael Lee
(74) Attorney, Agent, or Firm — Dority & Manning, P.A.

(57) ABSTRACT

An abnormality determination method includes: acquiring first information indicating a state of a first display device configured to display a first portion of a first image in a first area of a display area that displays the first image; acquiring second information indicating a state of a second display device configured to display a second portion of the first image that is different from the first portion in a second area of the display area that is different from the first area; and determining whether the first information is abnormal based on the second information.

18 Claims, 13 Drawing Sheets

| ITEM | FIRST PROJECTOR FIRST INFORMATION GROUP | SECOND PROJECTOR SECOND INFORMATION GROUP |
|---|---|---|
| FIRST FAN ROTATION SPEED | 180 | 175 |
| SECOND FAN ROTATION SPEED | 120 | 123 |
| FIRST INTERNAL TEMPERATURE | 59 | 60 |
| SECOND INTERNAL TEMPERATURE | 40 | 43 |
| EXTERNAL TEMPERATURE | 38 | 37 |
| CUMULATIVE USAGE TIME | 2000 | 1998 |

| ITEM | FIRST PROJECTOR FIRST INFORMATION GROUP | SECOND PROJECTOR SECOND INFORMATION GROUP |
|---|---|---|
| FIRST FAN ROTATION SPEED | 179 | 180 |
| SECOND FAN ROTATION SPEED | 121 | 130 |
| FIRST INTERNAL TEMPERATURE | 60 | |
| SECOND INTERNAL TEMPERATURE | 43 | 39 |
| EXTERNAL TEMPERATURE | 35 | 37 |
| CUMULATIVE USAGE TIME | 1800 | 1799 |

FIG. 10

| ITEM | FIRST PROJECTOR FIRST INFORMATION GROUP | SECOND PROJECTOR SECOND INFORMATION GROUP | THIRD PROJECTOR THIRD INFORMATION GROUP |
|---|---|---|---|
| FIRST FAN ROTATION SPEED | 180 | 175 | 182 |
| SECOND FAN ROTATION SPEED | 120 | 123 | 121 |
| FIRST INTERNAL TEMPERATURE | 59 | 60 | 58 |
| SECOND INTERNAL TEMPERATURE | 40 | 43 | 38 |
| EXTERNAL TEMPERATURE | 38 | 37 | 40 |
| CUMULATIVE USAGE TIME | 2000 | 1998 | 2000 |

FIG. 12

| ITEM | FIRST PROJECTOR FIRST INFORMATION GROUP | SECOND PROJECTOR SECOND INFORMATION GROUP | THIRD PROJECTOR THIRD INFORMATION GROUP |
|---|---|---|---|
| FIRST FAN ROTATION SPEED | 179 | 180 | 175 |
| SECOND FAN ROTATION SPEED | 121 | 130 | 125 |
| FIRST INTERNAL TEMPERATURE | 60 | | 62 |
| SECOND INTERNAL TEMPERATURE | 43 | 39 | 40 |
| EXTERNAL TEMPERATURE | 35 | 37 | 38 |
| CUMULATIVE USAGE TIME | 1800 | 1799 | 1799 |

FIG. 13

| ITEM | FIRST PROJECTOR FIRST INFORMATION GROUP | SECOND PROJECTOR SECOND INFORMATION GROUP | THIRD PROJECTOR THIRD INFORMATION GROUP |
|---|---|---|---|
| FIRST FAN ROTATION SPEED | 190 | 194 | 189 |
| SECOND FAN ROTATION SPEED | 130 | 129 | 135 |
| FIRST INTERNAL TEMPERATURE | 60 | 58 | 30 |
| SECOND INTERNAL TEMPERATURE | 45 | 46 | 48 |
| EXTERNAL TEMPERATURE | 60 | 58 | 62 |
| CUMULATIVE USAGE TIME | 3000 | 3001 | 3000 |

FIG. 15

| ITEM | FIRST PROJECTOR FIRST INFORMATION GROUP | SECOND PROJECTOR SECOND INFORMATION GROUP | THIRD PROJECTOR THIRD INFORMATION GROUP |
|---|---|---|---|
| FIRST FAN ROTATION SPEED | 175 | 178 | 177 |
| SECOND FAN ROTATION SPEED | 118 | 120 | 119 |
| FIRST INTERNAL TEMPERATURE | 55 | 54 | 56 |
| SECOND INTERNAL TEMPERATURE | 42 | 43 | 44 |
| EXTERNAL TEMPERATURE | 40 | 39 | 40 |
| CUMULATIVE USAGE TIME | 2300 | 4000 | 2300 |

ABNORMALITY DETERMINATION METHOD, CONTROL DEVICE, AND NON-TRANSITORY COMPUTER-READABLE STORAGE MEDIUM STORING PROGRAM

The present application is based on, and claims priority from JP Application Serial Number 2022-183939, filed Nov. 17, 2022, the disclosure of which is hereby incorporated by reference herein in its entirety.

BACKGROUND

1. Technical Field

The present disclosure relates to an abnormality determination method, a control device, and a non-transitory computer-readable storage medium storing a program.

2. Related Art

JP-A-2007-108205 discloses a maintenance system for a projector. In the maintenance system, a projector is coupled to a server via a network. The server acquires load information of a light modulation element from the projector. The server determines a degree of characteristic change of the light modulation element from the acquired load information. The server generates maintenance information based on a result of determining the degree of characteristic change.

With the technique disclosed in JP-A-2007-108205, correct determination cannot be made when information is incomplete, such as when the load information cannot be correctly received from the projector, or when reliability of data indicated by the load information from the projector is low.

SUMMARY

An abnormality determination method includes: acquiring first information indicating a state of a first display device configured to display a first portion of a first image in a first area of a display area that displays the first image; acquiring second information indicating a state of a second display device configured to display a second portion of the first image that is different from the first portion in a second area of the display area that is different from the first area; and determining whether the first information is abnormal based on the second information.

A control device that controls a first display device and a second display device includes: a processor. The processor is configured to execute: acquiring first information indicating a state of a first display device configured to display a first portion of a first image in a first area of a display area that displays the first image; acquiring second information indicating a state of a second display device configured to display a second portion of the first image that is different from the first portion in a second area of the display area that is different from the first area; and determining whether the first information is abnormal based on the second information.

A non-transitory computer-readable storage medium storing a program, the program causes a processor to execute operations including: acquiring first information indicating a state of a first display device configured to display a first portion of a first image in a first area of a display area that displays the first image; acquiring second information indicating a state of a second display device configured to display a second portion of the first image that is different from the first portion in a second area of the display area that is different from the first area; and determining whether the first information is abnormal based on the second information.

BRIEF DESCRIPTION OF THE DRAWINGS

FIG. 10 is a diagram showing examples of the first information group, the second information group, and a third information group.

FIG. 12 is a diagram showing examples of the first information group, the second information group, and the third information group.

FIG. 13 is a diagram showing examples of the first information group, the second information group, and the third information group.

FIG. 15 is a diagram showing examples of the first information group, the second information group, and the third information group.

DESCRIPTION OF EMBODIMENTS

Next, a first embodiment will be described.

Figure 1:
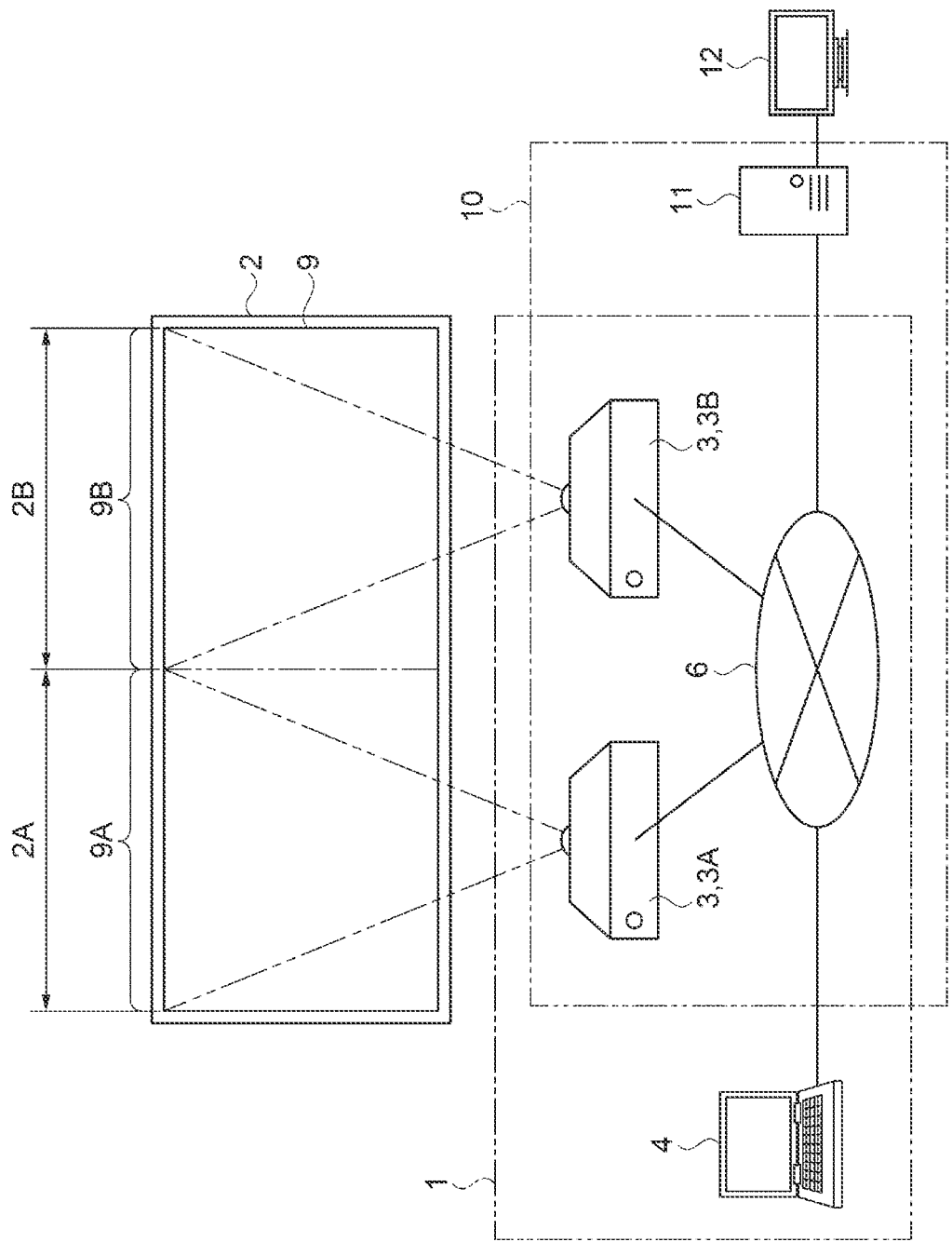
FIG. 1 is a diagram showing a display system and a control system according to a first embodiment.

As shown in FIG. 1, a display system 1 includes a plurality of projectors 3 that display an image on a display surface 2, and an image supply device 4 that supplies the image to the plurality of projectors 3. The display surface 2 is an example of a display area. The display surface 2 is, for example, a projection surface such as a screen on which an image is projected. The projector 3 is an example of a display device. The display system 1 includes two projectors 3, i.e., a first projector 3A and a second projector 3B, as the plurality of projectors 3. When the two projectors 3 are distinguished from each other, they are denoted as the first projector 3A and the second projector 3B. The first projector 3A and the second projector 3B have the same configuration. In FIG. 1, the first projector 3A is disposed on the left of the second projector 3B, but the arrangement order may be right or left. The first projector 3A is an example of a first display device. The second projector 3B is an example of a second display device.

The image supply device 4 supplies image data to the plurality of projectors 3. The image supply device 4 is, for example, a personal computer. The plurality of projectors 3 display an image based on the image data received from the image supply device 4. The plurality of projectors 3 display the image on the display surface 2 by projecting image light based on the image data. The image supply device 4 and the plurality of projectors 3 are communicably connected to each other via a network 6. The network 6 is, for example, a local area network (LAN), and communication is executed according to the Ethernet (registered trademark) standard.

The first projector 3A and the second projector 3B cooperate with each other to display a first image 9 on the display surface 2. The image supply device 4 supplies image data corresponding to a first portion 9A of the first image 9 to the first projector 3A. The image supply device 4 supplies image data corresponding to a second portion 9B of the first image 9 to the second projector 3B. The first portion 9A and the second portion 9B include portions of the first image 9 that are different from each other.

The first projector 3A displays the first portion 9A of the first image 9 in a first area 2A of the display surface 2. The second projector 3B displays the second portion 9B of the first image 9 in a second area 2B of the display surface 2. The first area 2A and the second area 2B are areas of the display surface 2 that are different from each other. The first projector 3A displays the first portion 9A in the first area 2A by projecting the first portion 9A toward the first area 2A of the display surface 2. The second projector 3B displays the second portion 9B in the second area 2B by projecting the second portion 9B toward the second area 2B of the display surface 2.

As shown in FIG. 1, the control system 10 includes a control device 11, the first projector 3A, and the second projector 3B. The control system 10 determines an abnormality of the first projector 3A and the second projector 3B by the control device 11. The control device 11 is, for example, a server device. The control device 11 may include a display monitor 12. The control device 11 and the plurality of projectors 3 are communicably connected to each other via the network 6.

Figure 2:
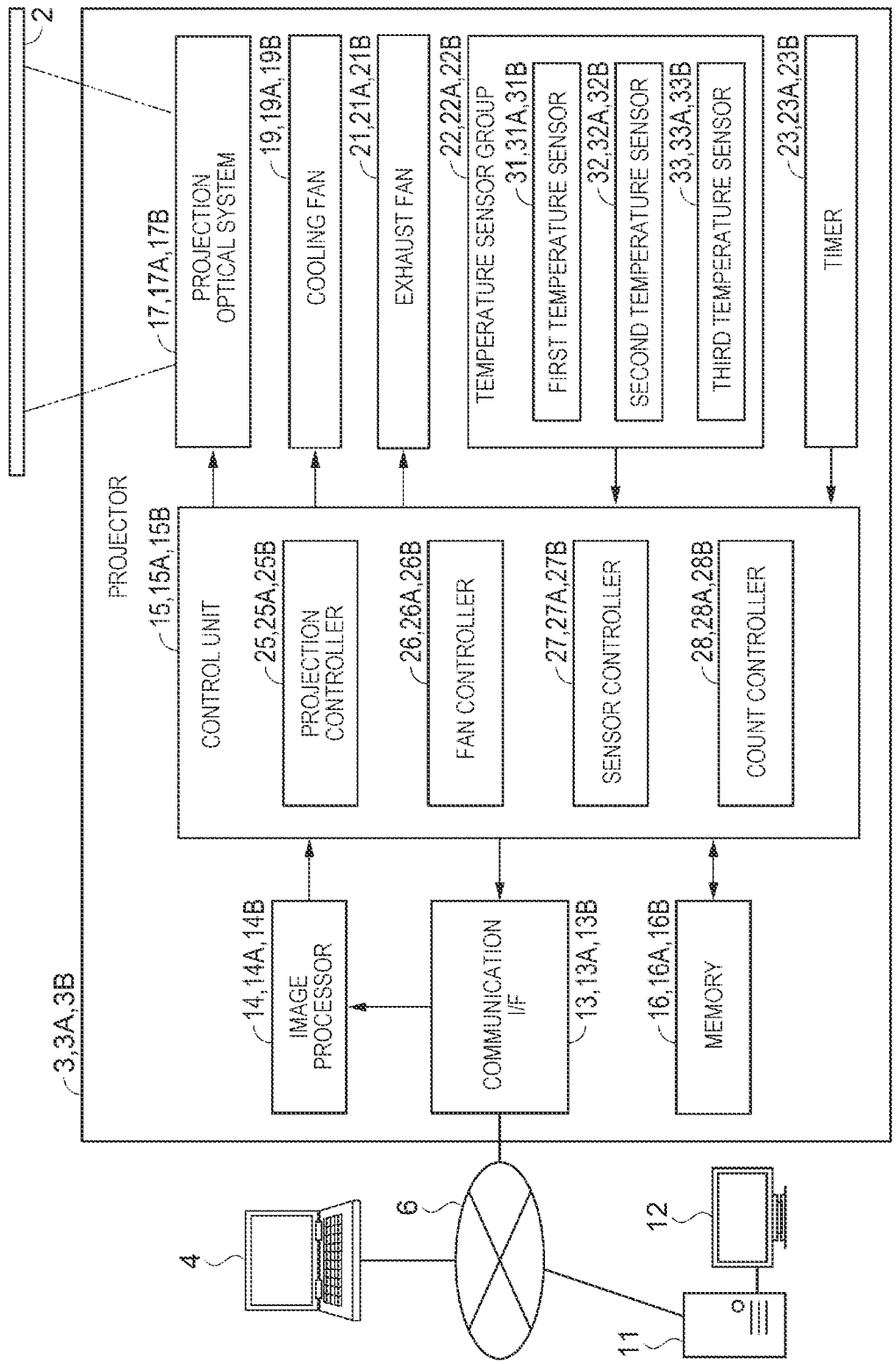
FIG. 2 is a block diagram showing a configuration of a projector.

As shown in FIG. 2, the projector 3 includes a communication interface 13, an image processor 14, a control unit 15, a memory 16, and a projection optical system 17. The projector 3 further includes a cooling fan 19, an exhaust fan 21, a temperature sensor group 22, and a timer 23. In FIG. 2, the interface is denoted as an I/F. As described above, the first projector 3A and the second projector 3B have the same configuration. When identifying the configuration of the projector 3 by the first projector 3A and the second projector 3B, the configuration of the projector 3 is identified by adding an ordinal number before the configuration name and adding an alphabetic character to the reference numeral of each configuration. For example, the communication interface 13 of the first projector 3A is identified as a first communication interface 13A. The communication interface 13 of the second projector 3B is identified as a second communication interface 13B. Thus, the first communication interface 13A and the second communication interface 13B are identified.

The communication interface 13 is communicably connected to an external device such as the image supply device 4 and the control device 11. The communication interface 13 communicates with the external device according to a predetermined communication protocol. The form of communication may be either wired or wireless. The communication interface 13 includes, for example, a wired-communication connecting port, a wireless-communication antenna, and an interface circuit. The communication interface 13 receives the image data from the image supply device 4. The communication interface 13 transmits various pieces of data to the control device 11. The communication interface 13 outputs the image data received from the image supply device 4 to the image processor 14.

The image processor 14 loads input image data into a frame memory (not shown) and performs image processing on the loaded image data. The image processing performed by the image processor 14 includes, for example, a resolution conversion processing, a shape correction processing such as distortion correction, a digital zoom processing, a color correction processing, and a luminance correction processing. The image processor 14 reads the processed image data from the frame memory, and outputs the read image data as image information to the projection optical system 17 via the control unit 15.

The control unit 15 is a projector controller that controls the projector 3. The control unit 15 integrally controls an operation of the projector 3 by executing a projector control program stored in the memory 16. The memory 16 includes a random access memory (RAM), a read only memory (ROM), or the like. The RAM is used for temporarily storing various pieces of data and the like, and the ROM stores a control program for controlling the operation of the projector 3, various types of setting information, and the like. The memory 16 may also include the frame memory described above. The image processor 14 and the control unit 15 are, for example, a processor including a single or a plurality of central processing units (CPUs) or micro processing units (MPUs). The image processor 14 and the control unit 15 can also be implemented by an integrated circuit. The integrated circuit includes a large scale integration (LSI), an application specific integrated circuit (ASIC), and a programmable logic device (PLD). The PLD includes, for example, a field-programmable gate array (FPGA). An analog circuit may be provided as a part of the integrated circuit configuration, or a combination of a processor and an integrated circuit may be used. The combination of a processor and an integrated circuit is called a microcontroller (MCU), a system-on-a-chip (SoC), a system LSI, a chip set, or the like.

The control unit 15 functions as various functional units by executing the control program stored in the memory 16. The control unit 15 includes, as the functional units, a projection controller 25, a fan controller 26, a sensor controller 27, and a count controller 28. The control unit 15 functions as the projection controller 25, the fan controller 26, the sensor controller 27, and the count controller 28 by executing the control program stored in the memory 16.

The projection controller 25 controls the projection optical system 17. The projection optical system 17 includes a light source, a light modulation device, a projection lens, and the like. A lamp, a laser light source, or the like is applied as the light source. The light modulation device includes a light modulation element. The light modulation device modulates light from the light source by the light modulation element based on the image data. For example, a transmissive liquid crystal panel is applied as the light modulation element. The projection controller 25 outputs the image data received from the image processor 14 to the projection optical system 17. The projection controller 25 causes the projection optical system 17 to project an image based on the image data by controlling the projection optical system 17. The light modulation element may include a reflective liquid crystal panel, a liquid crystal on silicon (LCOS) liquid crystal panel, or a light modulation panel other than the liquid crystal panel, for example, a digital micromirror device (DMD), instead of the transmissive liquid crystal panel.

The fan controller 26 controls the cooling fan 19 and the exhaust fan 21. The cooling fan 19 cools the projection optical system 17. The cooling fan 19 includes a fan that blows air toward the projection optical system 17 and a motor that generates power for driving the fan. The fan controller 26 controls the driving of the cooling fan 19 by controlling the driving of the motor. The exhaust fan 21 exhausts the air inside the projector 3 to the outside. The exhaust fan 21 includes a fan and a motor that generates power for driving the fan. The fan controller 26 controls the driving of the exhaust fan 21 by controlling the driving of the motor.

The fan controller 26 detects respective rotation speeds of the cooling fan 19 and the exhaust fan 21 when the cooling fan 19 and the exhaust fan 21 are driven. The rotation speeds of the cooling fan 19 and the exhaust fan 21 are replaced by rotation speeds of the motors that drive the cooling fan 19 and the exhaust fan 21, respectively. That is, the fan controller 26 detects the rotation speeds of the respective motors when driving the cooling fan 19 and the exhaust fan 21. The rotation speed of the motor is detected by measuring a value of a current flowing through a coil of the motor. The rotation speeds of the cooling fan 19 and the exhaust fan 21 are each a type of information indicating a state of the projector 3. The rotation speeds of the cooling fan 19 and the exhaust fan 21 are stored in the memory 16 as data of a first fan rotation speed and a second fan rotation speed, respectively. The data of the first fan rotation speed and the second fan rotation speed is transmitted from the communication interface 13 to the control device 11.

The sensor controller 27 controls the temperature sensor group 22. The temperature sensor group 22 includes a first temperature sensor 31, a second temperature sensor 32, and a third temperature sensor 33. The first temperature sensor 31 is disposed in the vicinity of the projection optical system 17. The first temperature sensor 31 detects the temperature in the vicinity of the projection optical system 17. The first temperature sensor 31 outputs, to the control unit 15, a result detected based on an instruction of the sensor controller 27 as a first internal temperature. The second temperature sensor 32 is disposed at a position different from the position of the first temperature sensor 31. The second temperature sensor 32 detects the temperature inside the projector 3. The second temperature sensor 32 outputs, to the control unit 15, a result detected based on an instruction from the sensor controller 27 as a second internal temperature.

The third temperature sensor 33 is disposed in the vicinity of an air vent formed in an exterior case (not shown) of the projector 3. The air vent is an inlet and outlet for air in the exterior case. When the exhaust fan 21 is driven, the air in the exterior case is exhausted from the air vent to the outside of the exterior case. The third temperature sensor 33 detects the temperature in the vicinity of the air vent. The third temperature sensor 33 outputs, to the control unit 15, a result detected based on an instruction from the sensor controller 27 as an external temperature. The data of the first internal temperature, the second internal temperature, and the external temperature received by the control unit 15 are stored in the memory 16. The data of the first internal temperature, the second internal temperature, and the external temperature are transmitted from the communication interface 13 to the control device 11.

The count controller 28 measures various times by controlling the timer 23. Examples of the time measured by the count controller 28 include a cumulative operation time of the light source of the projection optical system 17, a cumulative operation time of the cooling fan 19, and a cumulative operation time of the exhaust fan 21. The projector 3 includes a filter (not shown). The filter is disposed, for example, in the air vent of the exterior case. The filter traps foreign matter, such as dust, suspended in the air entering through the air vent. Examples of the time measured by the count controller 28 also include a cumulative usage time of the filter. By measuring the above-described various cumulative operation times and the cumulative usage time, a replacement timing of various replacement components can be measured. That is, by measuring the various times by the count controller 28, the replacement timing of the replacement components such as the light source, the cooling fan 19, the exhaust fan 21, and the filter can be measured.

Figures 3, 4:
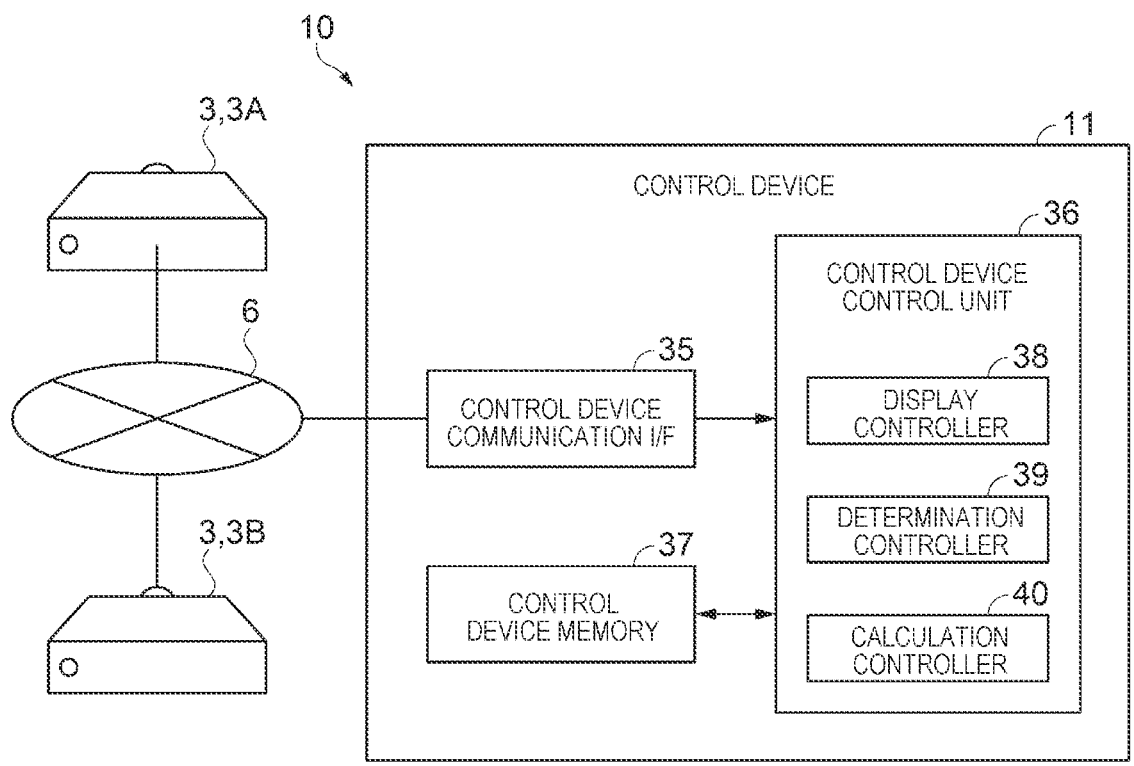
FIG. 3 is a block diagram showing a configuration of a control device.
FIG. 4 is a diagram showing examples of a first information group and a second information group.

As shown in FIG. 3, the control device 11 includes a control device communication interface 35, a control device control unit 36, and a control device memory 37. In FIG. 3, the interface is denoted as an I/F. The control device communication interface 35 is communicably connected to the first projector 3A and the second projector 3B. The control device communication interface 35 communicates with the first projector 3A and the second projector 3B according to a predetermined communication protocol. The form of communication may be either wired or wireless.

The control device communication interface 35 includes, for example, a wired-communication connecting port, a wireless-communication antenna, and an interface circuit. The control device communication interface 35 receives, from the first projector 3A, first information indicating a state of the first projector 3A. The control device communication interface 35 receives, from the second projector 3B, second information indicating a state of the second projector 3B. The control device communication interface 35 outputs, to the control device control unit 36, the first information and the second information received from the first projector 3A and the second projector 3B.

The control device control unit 36 is a control device controller that controls the control device 11. The control device control unit 36 is, for example, a processor including a central processing unit (CPU) or a micro processing unit (MPU). The control device control unit 36 integrally controls an operation of the control device 11 by executing a control program stored in the control device memory 37. The control device memory 37 includes a random access memory (RAN) and a read only memory (ROM). The RAM is used for temporarily storing various pieces of data and the like, and the ROM stores a control program for controlling the operation of the control device 11, various types of setting information, and the like.

The control device control unit 36 functions as various functional units by executing the control program stored in the control device memory 37. The control device control unit 36 includes, as the functional units, a display controller 38, a determination controller 39, and a calculation controller 40. The control device control unit 36 functions as the display controller 38, the determination controller 39, and the calculation controller 40 by executing the control program stored in the control device memory 37.

The display controller 38 controls the display monitor 12 shown in FIG. 2 to cause various types of information to be displayed on the display monitor 12. In FIG. 3, the determination controller 39 determines the states of the first projector 3A and the second projector 3B based on the first information and the second information received from the first projector 3A and the second projector 3B. The calculation controller 40 performs various types of calculation processing based on the first information and the second information received from the first projector 3A and the second projector 3B.

An example of the information received by the control device 11 from the first projector 3A and the second projector 3B will be described. The information that the control device 11 receives from the first projector 3A and the information that the control device 11 receives from the second projector 3B each include, for example, information of six items, as shown in FIG. 4. The information of six items includes the first fan rotation speed, the second fan rotation speed, the first internal temperature, the second internal temperature, the external temperature, and the cumulative usage time. The information of six items that the control device 11 receives from the first projector 3A constitutes the first information group. The information of six items that the control device 11 receives from the second projector 3B constitutes the second information group.

The first projector 3A transmits the information of six items as the first information group to the control device 11. The information of each of the six items in the first information group is the first information. The six pieces of first information constitute the first information group. Each of the six pieces of first information indicates the state of the first projector 3A. The second projector 3B transmits the information of six items as the second information group to the control device 11. The information of each of the six items in the second information group is the second information. The six pieces of second information constitute the second information group. Each of the six pieces of second information indicates the state of the second projector 3B.

The first fan rotation speed is a rotation speed of the cooling fan 19. The second fan rotation speed is a rotation speed of the exhaust fan 21. The first fan rotation speed and the second fan rotation speed indicate the number of rotations per minute. The first internal temperature is a temperature detected by the first temperature sensor 31. The second internal temperature is a temperature detected by the second temperature sensor 32. The external temperature is a temperature detected by the third temperature sensor 33. The units of the first internal temperature, the second internal temperature, and the external temperature are degrees Celsius. The cumulative usage time is, for example, a cumulative operation time of the light source. The unit of the cumulative usage time is hours.

The control device 11 periodically receives the first information group and the second information group. For example, the control device 11 receives the first information group and the second information group at a predetermined time once a day. This can be implemented by the control device 11 periodically requesting the first projector 3A and the second projector 3B to transmit information. This can also be implemented by programming the projector 3 to transmit information periodically. Further, this can be implemented by the image supply device 4 periodically instructing the projector 3 to transmit information.

Abnormality determination processing will be described.

Figure 5:
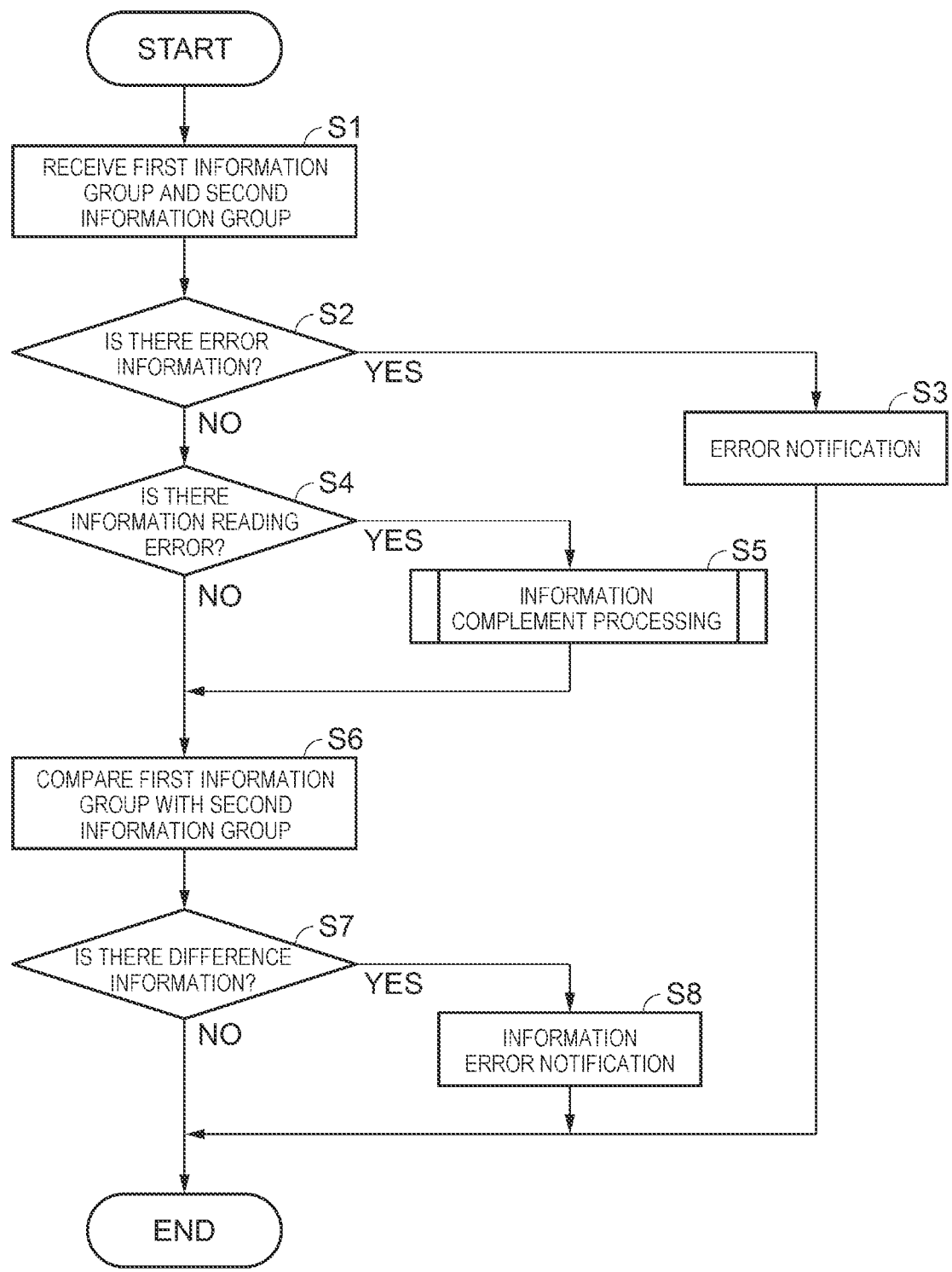
FIG. 5 is a flowchart showing abnormality determination processing in the first embodiment.

The abnormality determination processing is performed by the control device control unit 36 of the control device 11 executing an abnormality determination method according to an abnormality determination program. In the abnormality determination processing, as shown in FIG. 5, the first information group and the second information group are received in step S1. Step S1 is an example of acquiring the first information. Step S1 is an example of acquiring the second information. Next, in step S2, it is determined whether there is error information. Whether there is error information is determined by determining whether the information of each of the six items in the first information group and the second information group exceeds a management limit. When there is information exceeding the management limit in the information of six items in the first information group and the second information group, there is error information, that is, YES is determined in step S2, and the processing proceeds to step S3. When there is no information exceeding the management limit in the information of six items in the first information group and the second information group, there is no error information, that is, NO is determined in step S2, the processing proceeds to step S4.

In step S3, an error notification is performed, and then the abnormality determination processing ends. The error notification is performed, for example, by causing the display monitor 12 to display that an error occurs. The error notification can also be implemented by displaying that an error occurs in the image displayed by the projector 3. In step S4, it is determined whether there is an information reading error. The information reading error is, for example, an error in which information cannot be read more correctly due to data missing or a mismatch of a data format.

Figures 6, 7:
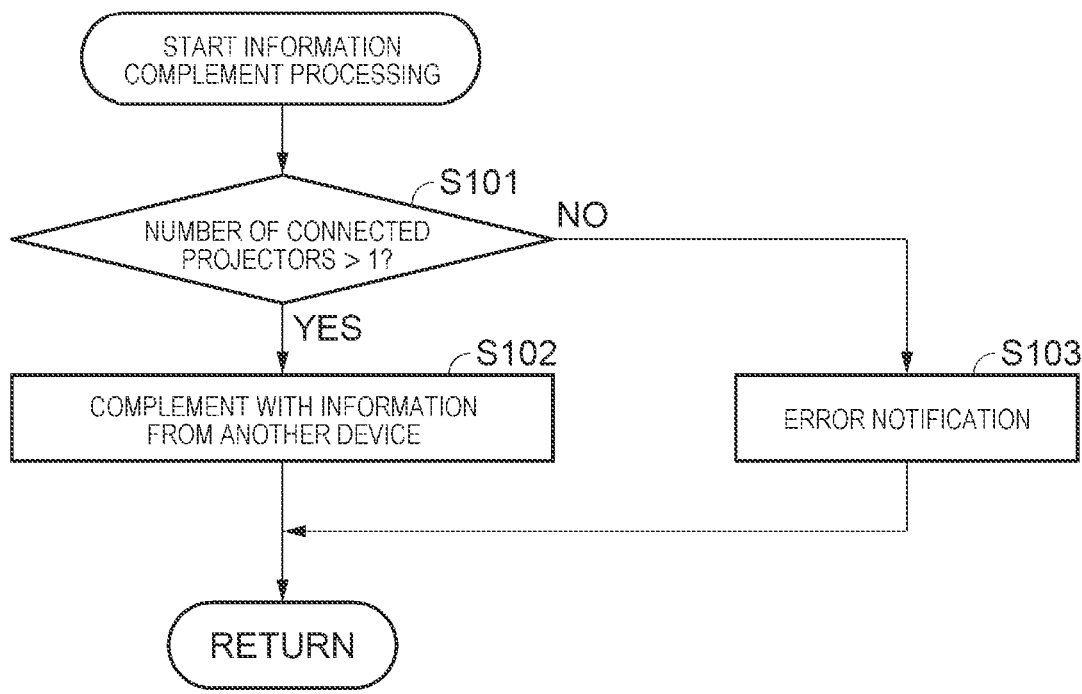
FIG. 6 is a diagram showing examples of the first information group and the second information group.
FIG. 7 is a flowchart showing information complement processing in the first embodiment.

Here, regarding the information reading error, the data missing will be described as an example. For example, as shown in FIG. 6, data indicating the first internal temperature is missing among the second information of six items in the second information group received from the second projector 3B. In this case, in the abnormality determination processing shown in FIG. 5, when there is an information reading error, YES is determined in step S4, and the processing proceeds to information complement processing in step S5.

In the information complement processing, as shown in FIG. 7, it is determined whether the number of connected projectors exceeds 1 in step S101. The number of connected projectors is the number of projectors 3 connected to the control system 10. In the embodiment, since two projectors 3 are connected to the control system 10, the number of connected projectors exceeds one. Accordingly, YES is determined in step S101, and the processing proceeds to step S102. On the other hand, when NO is determined in step S101, the processing proceeds to step S103, an error notification is performed, and then the information complement processing ends. Step S102 is an example of complementing the first information. Since the error notification in step S103 is the same as the error notification in step S3 shown in FIG. 5, detailed description thereof will be omitted.

In step S102 shown in FIG. 7, complementation is performed with information from another device. In an example shown in FIG. 6, data indicating the first internal temperature received from the second projector 3B is missing. Therefore, the data is complemented with data of the first internal temperature of the first projector 3A which is the other device. The data of the first internal temperature of the first projector 3A indicates 60° C. Accordingly, in step S102 shown in FIG. 7, the first internal temperature of the second projector 3B is complemented with the data of 60° C. After the processing in step S102, the information complement processing ends, and the processing proceeds to step S6 shown in FIG. 5.

In step S6, the first information group and the second information group are compared. Next, in step S7, it is determined whether there is difference information. The difference information is information indicating that there is a difference exceeding a predetermined range between the information of six items in the first information group and the information of six items in the second information group. The predetermined range is, for example, a range equivalent to or slightly larger than a range of variation occurring between a value of each item in the first information group and a value of each corresponding item in the second information group due to an individual difference between the first projector 3A and the second projector 3B. More specifically, in step S6, the difference between the value of each item in the first information group and the value of each corresponding item in the second information group is calculated. In step S7, values of the six differences calculated in step S6 are compared with predetermined ranges determined for the respective items. When there is an item whose difference exceeds the predetermined range, that is, when there is a difference greater than the individual difference occurring in each item, it is determined that there is difference information. That is, the processing in step S7 is an example of processing of determining whether the first information is abnormal based on the second information. The processing in step S7 may be processing of determining whether the second information is abnormal based on the first information. When there is difference information and YES is determined in step S7, the processing proceeds to step S8. On the other hand, when NO is determined in step S7, the abnormality determination processing ends. In step S8, an information error notification is performed, and then the abnormality determination processing ends.

The information error notification is a notification for notifying that there is a difference in information indicating the state of the projector 3 among the plurality of projectors 3. The information error notification is performed, for example, by causing the display monitor 12 to display that a difference in information occurs among the plurality of projectors 3. The information error notification is an example of notifying a result of determining whether the first information is abnormal. The information error notification can also be implemented by displaying it on the image displayed by the projector 3. Steps S4 and S5 shown in FIG. 5 and the information complement processing shown in FIG. 7 correspond to the calculation controller 40. Steps S7 and S8 shown in FIG. 5 correspond to the determination controller 39.

A display system 100 and a control system 110 according to a second embodiment will be described.

Figure 8:
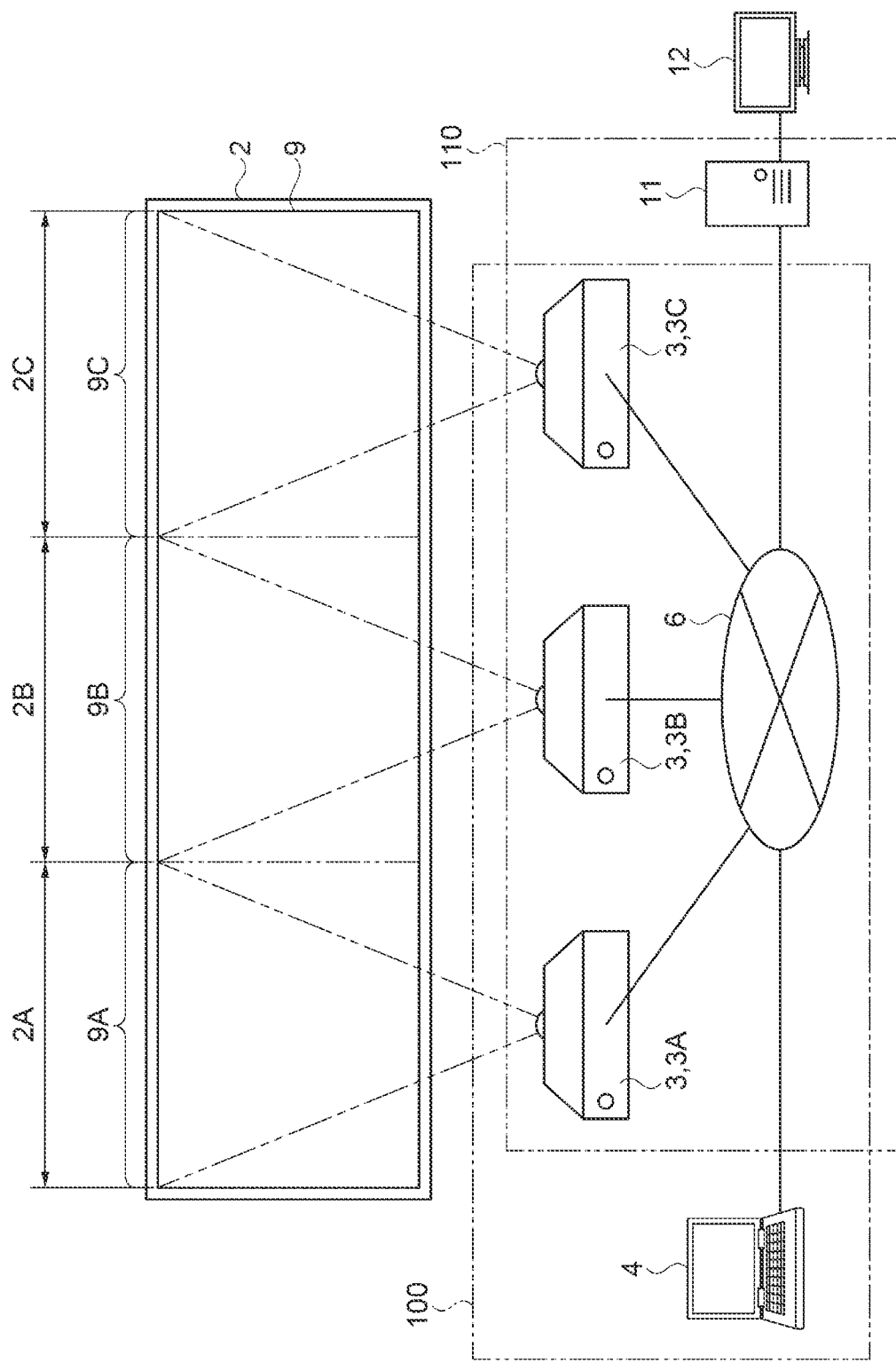
FIG. 8 is a diagram showing a display system and a control system according to a second embodiment.

As shown in FIG. 8, the display system 100 includes three projectors 3, i.e., the first projector 3A, the second projector 3B, and a third projector 3C. The display system 100 has a configuration the same as that of the display system 1 shown in FIG. 1 except that the third projector 3C is added to the display system 1. Therefore, among the configuration of the display system 100, a configuration the same as that of the display system 1 is denoted by a reference numeral the same as that of the display system 1, and detailed description thereof will be omitted.

Similarly, the control system 110 also has a configuration the same as that of the control system 10 shown in FIG. 1 except that the third projector 3C is added to the control system 10. Therefore, among the configuration of the control system 110, a configuration the same as that of the control system 10 is denoted by a reference numeral the same as that of the control system 10, and detailed description thereof will be omitted. In FIG. 8, the first projector 3A is disposed on the left of the second projector 3B, and the third projector 3C is disposed on the right of the second projector 3B. However, the arrangement order of any one of the three projectors 3 may be right, left, or center. The third projector 3C is an example of a third display device.

The first projector 3A, the second projector 3B, and the third projector 3C cooperate with each other to display the first image 9 on the display surface 2. The image supply device 4 supplies image data corresponding to the first portion 9A of the first image 9 to the first projector 3A. The image supply device 4 supplies image data corresponding to the second portion 9B of the first image 9 to the second projector 3B. The image supply device 4 supplies image data corresponding to a third portion 9C of the first image 9 to the third projector 3C. The first portion 9A, the second portion 9B, and the third portion 9C include portions of the first image 9 that are different from each other.

The first projector 3A displays the first portion 9A of the first image 9 in the first area 2A of the display surface 2. The second projector 3B displays the second portion 9B of the first image 9 in the second area 2B of the display surface 2. The third projector 3C displays the third portion 9C of the first image 9 in a third area 2C of the display surface 2. The first area 2A, the second area 2B, and the third area 2C are areas of the display surface 2 that are different from each other. The first projector 3A displays the first portion 9A in the first area 2A by projecting the first portion 9A toward the first area 2A of the display surface 2. The second projector 3B displays the second portion 9B in the second area 2B by projecting the second portion 9B toward the second area 2B of the display surface 2. The third projector 3C displays the third portion 9C in the third area 2C by projecting the third portion 9C toward the third area 2C of the display surface 2.

Figure 9:
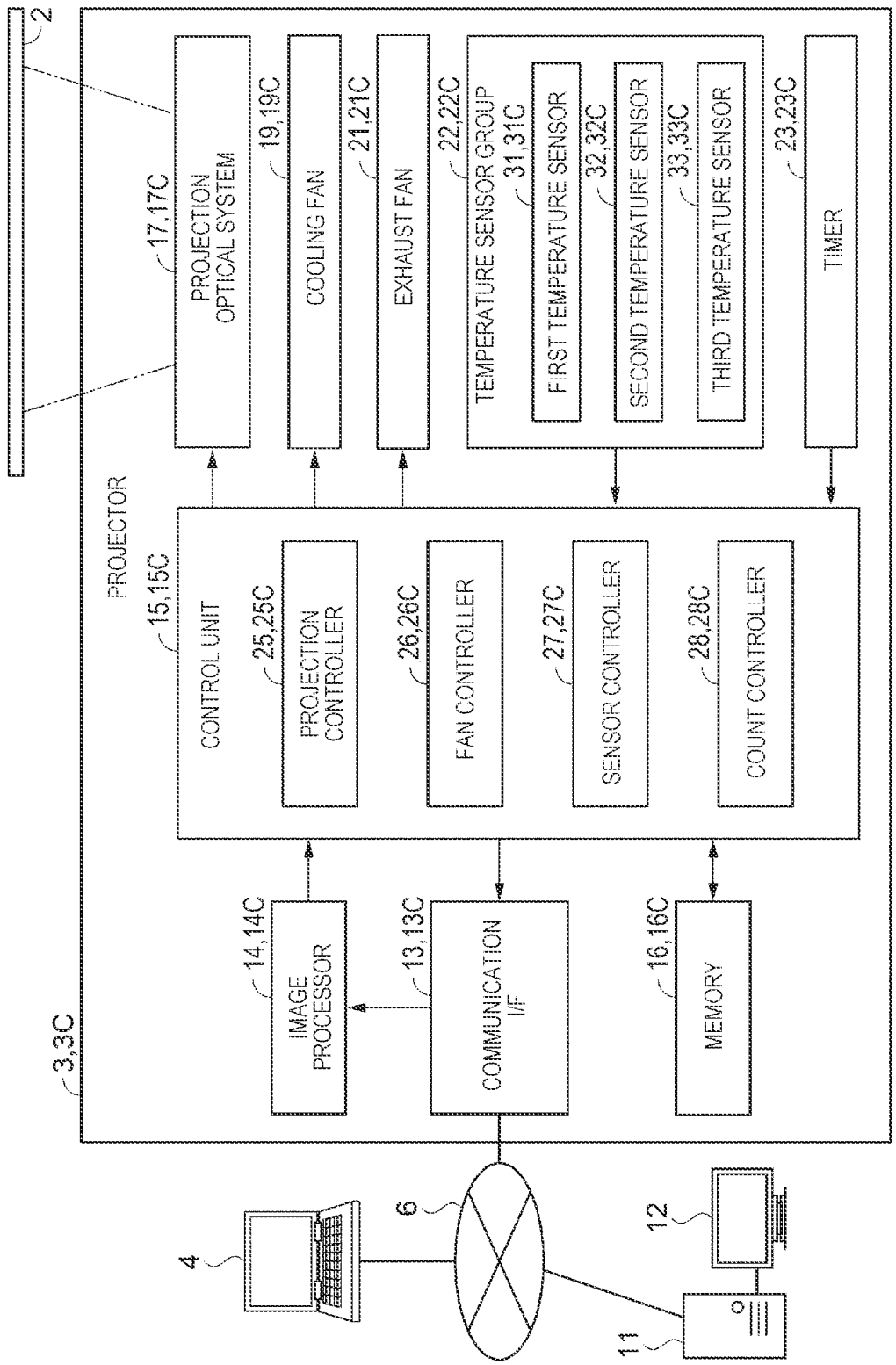
FIG. 9 is a block diagram showing a configuration of a third projector in the second embodiment.

As shown in FIG. 9, the third projector 3C includes the communication interface 13, the image processor 14, the control unit 15, the memory 16, and the projection optical system 17. The third projector 3C further includes the cooling fan 19, the exhaust fan 21, the temperature sensor group 22, and the timer 23. The third projector 3C has a configuration the same as that of the first projector 3A and the second projector 3B. Therefore, the configuration of the third projector 3C is denoted by a reference numeral the same as that of the configuration of the first projector 3A and the second projector 3B, and detailed description thereof will be omitted. When distinguishing the configuration of the third projector 3C from the configuration of the first projector 3A and the second projector 3B, the configuration of the third projector 3C is identified by adding an ordinal number "third" before the configuration name and adding an alphabetic character "C" to the reference numeral of each configuration.

Information that the control device 11 receives from the third projector 3C is the same as the information that the control device 11 receives from the first projector 3A and the second projector 3B. As shown in FIG. 10, a third information group that the control device 11 receives from the third projector 3C includes the first fan rotation speed, the second fan rotation speed, the first internal temperature, the second internal temperature, an external temperature, and a cumulative usage time. The information of each of the six items in the third information group is third information. The six pieces of third information constitute the third information group. Each of the six pieces of third information indicates the state of the third projector 3C.

Abnormality determination processing in the control system 110 will be described.

Figure 11:
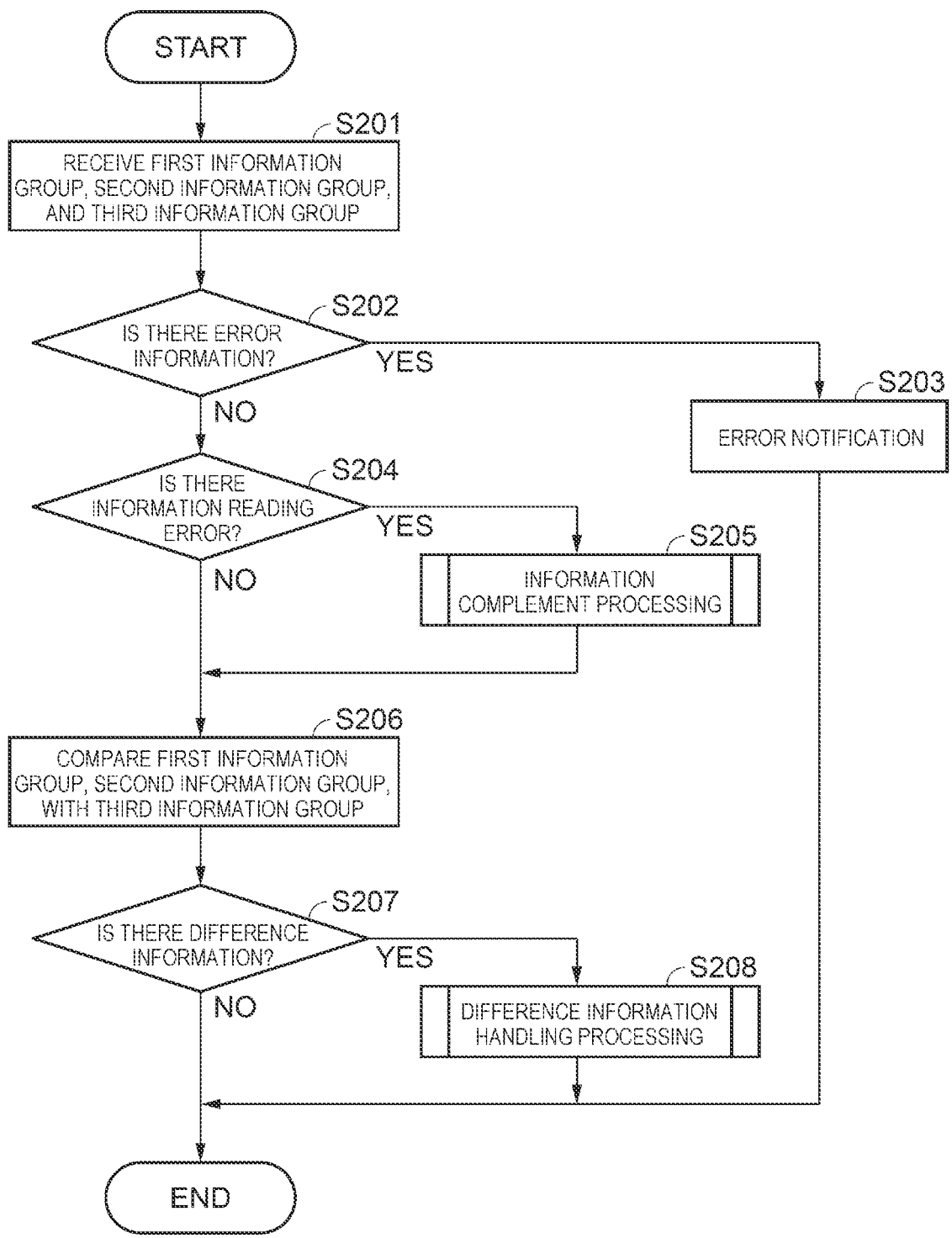
FIG. 11 is a flowchart showing abnormality determination processing in the second embodiment.

In the abnormality determination processing in the second embodiment, as shown in FIG. 11, the first information group, the second information group, and the third information group are received in step S201. Step S201 is an example of acquiring the third information. Next, in step S202, it is determined whether there is error information. Whether there is error information is determined by determining whether the information of each of the six items in the first information group, the second information group, and the third information group exceeds a management limit. When there is information exceeding the management limit in the information of six items in the first information group, the second information group, and the third information group, there is error information, that is, YES is determined in step S202, and the processing proceeds to step S203. When there is no information exceeding the management limit in the information of six items in the first information group, the second information group, and the third information group, there is no error information, that is, NO is determined in step S202, the processing proceeds to step S204.

In step S203, an error notification is performed, and then the abnormality determination processing ends. Since the processing in step S203 is the same as the processing in step S3 shown in FIG. 5, detailed description thereof will be omitted. In step S204, it is determined whether there is an information reading error. The information reading error is, for example, an error in which information cannot be read more correctly due to data missing or a mismatch of a data format.

Here, regarding the information reading error, the data missing will be described as an example. For example, as shown in FIG. 12, data indicating the first internal temperature is missing among the second information of six items in the second information group received from the second projector 3B. In this case, in the abnormality determination processing shown in FIG. 11, when there is an information reading error, and YES is determined in step S204, the processing proceeds to information complement processing in step S205. When there is no information reading error, and NO is determined in step S204, the processing proceeds to step S206.

Since the information complement processing in the second embodiment is similar to the information complement processing shown in FIG. 7, detailed description thereof will be omitted. When there is data missing shown in FIG. 12, complementation is performed with information from another device in the information complement processing. In the example shown in FIG. 12, data indicating the first internal temperature received from the second projector 3B is missing. Therefore, the data is complemented with data of the first internal temperature of the first projector 3A which is the other device or data of the first internal temperature of the third projector 3C which is the other device. The data of the first internal temperature of the first projector 3A indicates 60° C. The data of the first internal temperature of the third projector 3C indicates 62° C. Accordingly, in step S205 shown in FIG. 11, the first internal temperature of the second projector 3B is complemented with the data of 60° C. or the data of 62° C.

In step S206, the first information group, the second information group, and the third information group are compared with each other. Next, in step S207, it is determined whether there is difference information. The difference information is information in which there is a difference exceeding a predetermined range among the information of six items in the first information group, the information of six items in the second information group, and the information of six items in the third information group. Here, for example, when a difference between the first information and the second information exceeds a predetermined range and a difference between the second information and the third information is within a predetermined range, it is determined that the first information is abnormal. Step S207 is an example of determining that the first information is abnormal.

FIG. 13 shows an example. In the example shown in FIG. 13, the first internal temperature, which is one of the third information in the third information group from the third projector 3C, is different from the first information and the second information. In this case, the difference between the first information and the third information is 30, which exceeds the predetermined range. The difference between the first information and the second information is 2, which is within the predetermined range. Therefore, it is determined that the third information is abnormal. In the processing in step S207, other calculation methods can also be applied. The difference between the second information and the third information is 28, which exceeds the predetermined range. The difference between the first information and the second information is 2, which is within the predetermined range. Therefore, it may be determined that the third information is abnormal.

In the example shown in FIG. 13, the third information is assumed to be abnormal, but a case where the first information is abnormal and a case where the second information is abnormal can also be applied. That is, when the difference between the second information and the third information is within the predetermined range and the difference between the first information and the second information exceeds the predetermined range, it can be determined that the first information is abnormal. When the difference between the second information and the third information is within the predetermined range and the difference between the first information and the third information exceeds the predetermined range, it can be determined that the first information is abnormal. According to the abnormality determination method, the reliability of the abnormality determination of the first information can be increased.

When the difference between the first information and the third information is within the predetermined range and the difference between the first information and the second information exceeds the predetermined range, it can be determined that the second information is abnormal. When the difference between the first information and the third information is within the predetermined range and the difference between the third information and the second information exceeds the predetermined range, it can be determined that the second information is abnormal. According to the abnormality determination method, the reliability of the abnormality determination of the first information can be increased.

Figure 14:
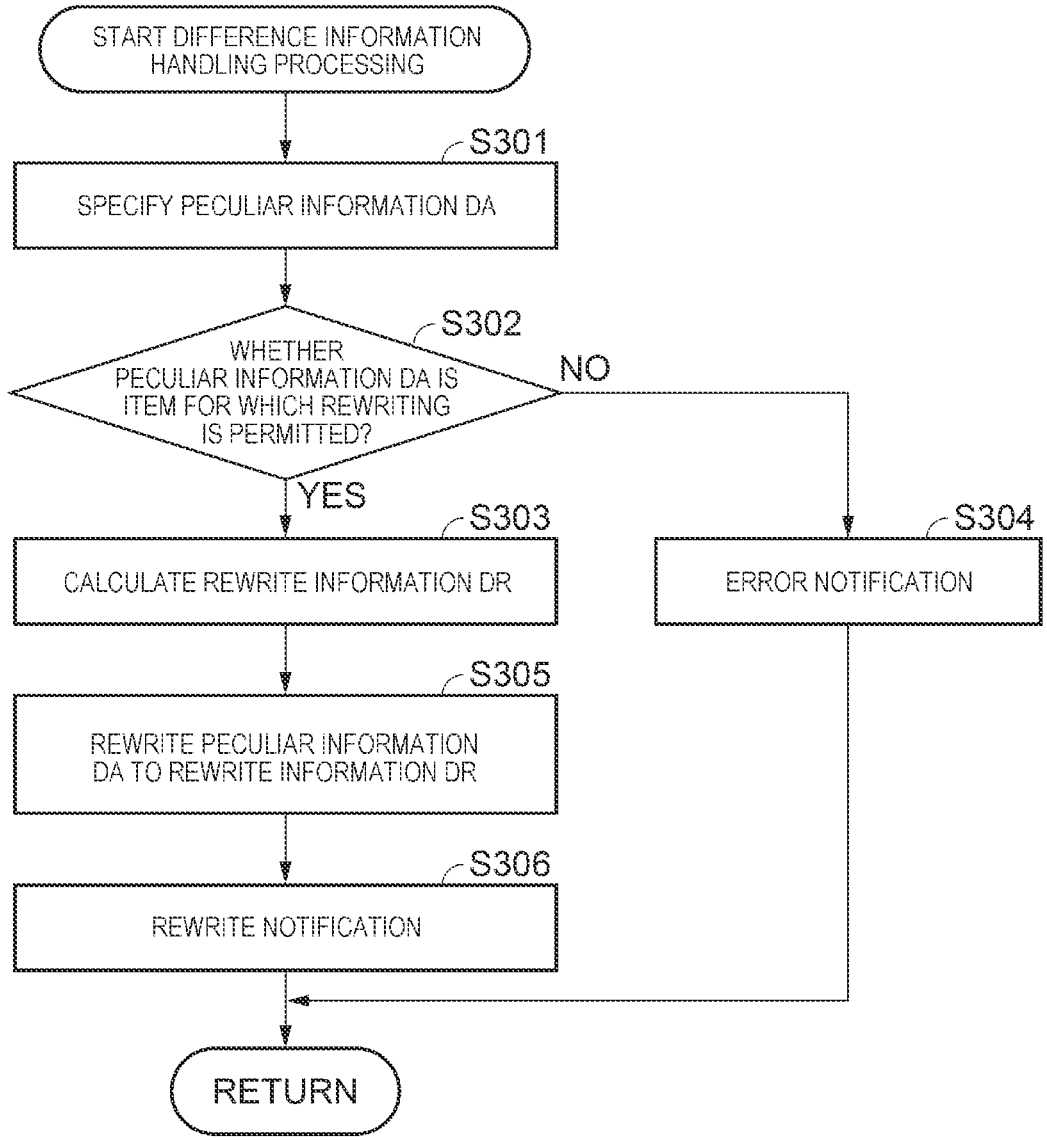
FIG. 14 is a flowchart showing difference information handling processing in the second embodiment.

When there is difference information in step S207 shown in FIG. 11 and YES is determined in step S207, the processing proceeds to difference information handling processing in step S208. On the other hand, when NO is determined in step S207, the abnormality determination processing ends. In the difference information handling processing in step S208, as shown in FIG. 14, peculiar information DA is specified in step S301. The peculiar information DA refers to information determined to have difference information in step S207 shown in FIG. 11 and determined to be abnormal. That is, the information determined to be abnormal in step S207 is the peculiar information DA. For example, when it is determined that the first internal temperature in the third information group shown in FIG. 13 is abnormal, in step S301 shown in FIG. 14, the information of 30 of the first internal temperature, which is the third information, is specified as the peculiar information DA.

Next, in step S302, it is determined whether the peculiar information DA is an item for which rewriting is permitted. The information indicating the state of the projector 3 includes an item for which rewriting is permitted and an item for which rewriting is not permitted. The item for which rewriting is not permitted is, for example, an item serving as an indicator for component replacement. Examples of the item for which rewriting is not permitted include the cumulative usage time shown in FIG. 15. The cumulative usage time is an item serving as an indicator for component replacement. In the example shown in FIG. 15, the cumulative usage time in the second information group is the peculiar information DA.

In the example shown in FIG. 15, the difference between the first information and the third information is within the predetermined range, and the difference between the first information and the second information exceeds the predetermined range. Accordingly, in the example shown in FIG. 15, it is determined that the second information which is the cumulative usage time in the second information group is abnormal. In the example shown in FIG. 15, rewriting of the peculiar information DA, which is information on the cumulative usage time in the second information group, is not permitted. In contrast, in the example shown in FIG. 13, the information on the first internal temperature in the third information group is the peculiar information DA. The first internal temperature is an item for which rewriting is permitted. Therefore, YES is determined in step S302 shown in FIG. 14, and the processing proceeds to step S303.

On the other hand, in the example shown in FIG. 15, NO is determined in step S302. When NO is determined in step S302, the error notification in step S304 is performed, and then the difference information handling processing ends. The error notification is a notification for notifying that the peculiar information DA is detected. The error notification is performed, for example, by causing the display monitor 12 to display that the peculiar information DA is detected. The error notification can also be implemented by displaying it on the image displayed by the projector 3.

In step S303, rewrite information DR is calculated. The rewrite information DR is new information to be adopted instead of the peculiar information DA determined to be abnormal. Various methods can be adopted as the method of calculating the rewrite information DR. In the embodiment, an arithmetic average is applied as the method of calculating the rewrite information DR. In the example shown in FIG. 13, the third information is the peculiar information DA, and thus the arithmetic average of the first information and the second information can be applied. Accordingly, in the example shown in FIG. 13, 59, which is an arithmetic average value of 60 and 58, is the rewrite information DR.

Next, in step S305, the peculiar information DA is rewritten to the rewrite information DR. Accordingly, in the example shown in FIG. 13, the information on the first internal temperature in the third information group is rewritten to 59. Next, in step S306, a rewrite notification is performed, and then the difference information handling processing ends. The rewrite notification in step S306 is a notification for notifying that the peculiar information DA is detected and that the peculiar information DA is rewritten to the rewrite information DR. The rewrite notification is performed, for example, by displaying it on the display monitor 12. The rewrite notification can also be implemented by displaying it on the image displayed by the projector 3. Step S204 and step S205 shown in FIG. 11 and the difference information handling processing shown in FIG. 14 correspond to the calculation controller 40. Step S207 shown in FIG. 11 corresponds to the determination controller 39.

A display system 200 and a control system 210 according to a third embodiment will be described.

Figure 16:
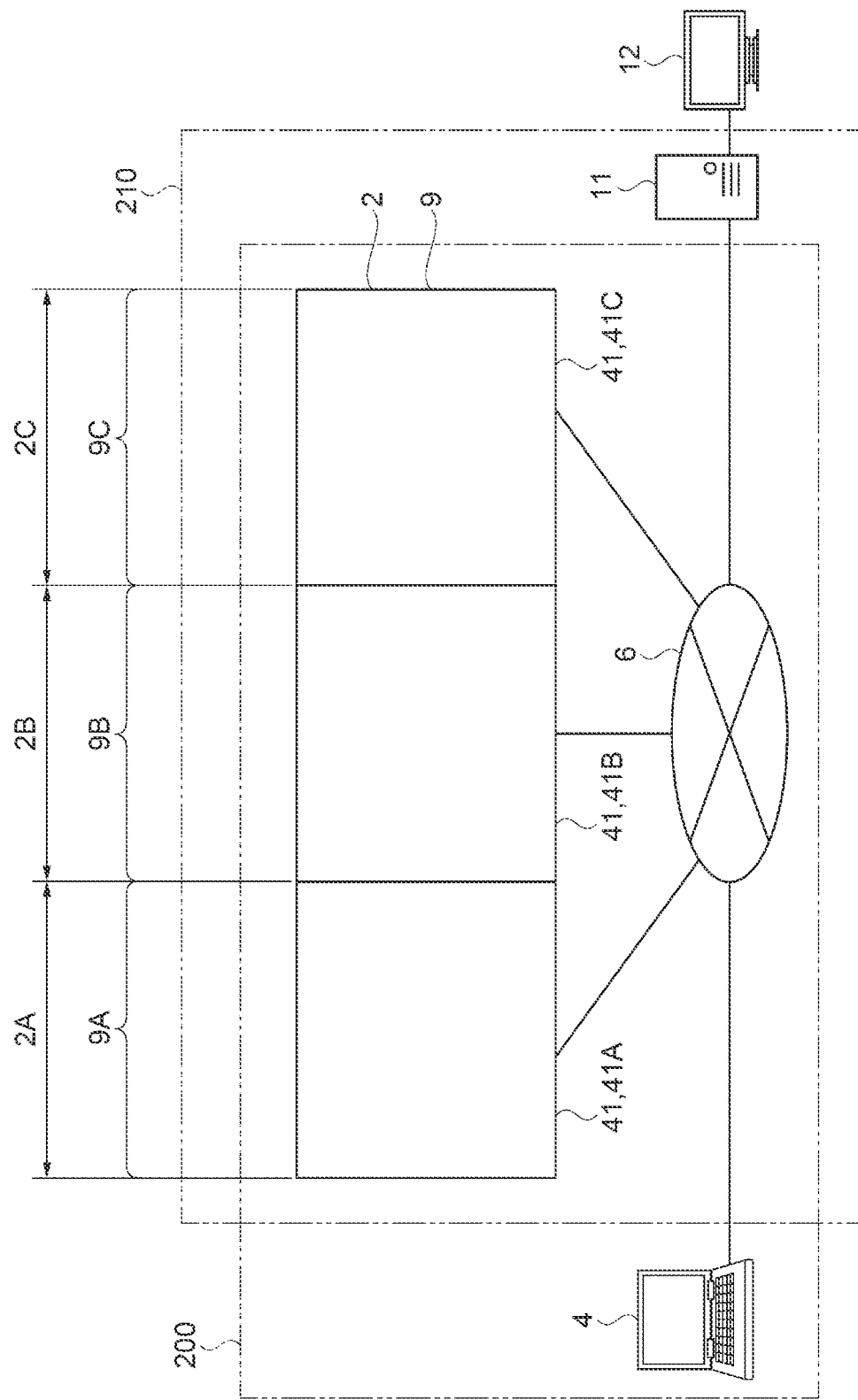
FIG. 16 is a diagram showing a display system and a control system according to a third embodiment.

As shown in FIG. 16, the display system 200 includes a plurality of display panels 41. In the embodiment, the display system 200 includes three display panels 41, i.e., a first display panel 41A, a second display panel 41B, and a third display panel 41C. As the display panel 41, various panels such as a liquid crystal display panel and an organic electro luminescence (EL) panel can be applied. By combining and disposing the plurality of display panels 41 together, a larger display screen can be formed. A configuration in which a plurality of display panels 41 are combined together is called a multi-display, a video wall, or the like.

The display system 200 has a configuration in which the projector 3 of the display system 1 shown in FIG. 1 and the display system 100 shown in FIG. 8 is replaced with the display panel 41. Similarly, the control system 210 has a configuration in which the projector 3 of the display system 1 shown in FIG. 1 and the display system 100 shown in FIG. 8 is replaced with the display panel 41. Except for this, the third embodiment has a configuration the same as that of the first embodiment and the second embodiment. Therefore, in the third embodiment, the configuration the same as that of the first embodiment and the second embodiment is denoted by a reference numeral the same as that of the first embodiment and the second embodiment, and detailed description thereof will be omitted.

In FIG. 16, the first display panel 41A is disposed on the left of the second display panel 41B, and the third display panel 41C is disposed on the right of the second display panel 41B. However, the arrangement order of any one of the three display panels 41 may be right, left, or center.

The first display panel 41A, the second display panel 41B, and the third display panel 41C cooperate with each other to display the first image 9 on the display surface 2. In the third embodiment, the display surface 2 is a display area for displaying the first image 9, and is an area obtained by combining display areas of the three display panels 41. The image supply device 4 supplies image data corresponding to the first portion 9A of the first image 9 to the first display panel 41A. The image supply device 4 supplies image data corresponding to the second portion 9B of the first image 9 to the second display panel 41B. The image supply device 4 supplies image data corresponding to the third portion 9C of the first image 9 to the third display panel 41C. The first portion 9A, the second portion 9B, and the third portion 9C include portions of the first image 9 that are different from each other.

The first display panel 41A displays the first portion 9A of the first image 9 in the first area 2A of the display surface 2. The second display panel 41B displays the second portion 9B of the first image 9 in the second area 2B of the display surface 2. The third display panel 41C displays the third portion 9C of the first image 9 in the third area 2C of the display surface 2. The first area 2A, the second area 2B, and the third area 2C are areas of the display surface 2 that are different from each other.

In the control system 210, the control device 11 receives information indicating a state of the display panel 41 from the display panel 41. Similar to the control system 10 and the control system 110, the control system 210 can determine an abnormality of the display panel 41 based on the information indicating the state of the display panel 41. In the third embodiment, the same effects as those of the first embodiment and the second embodiment can also be obtained.

SUMMARY OF PRESENT DISCLOSURE

Hereinafter, a summary of the present disclosure will be added.

(Appendix 1) An abnormality determination method including: acquiring first information indicating a state of a first display device configured to display a first portion of a first image in a first area of a display area that displays the first image; acquiring second information indicating a state of a second display device configured to display a second portion of the first image that is different from the first portion in a second area of the display area that is different from the first area; and determining whether the first information is abnormal based on the second information.

According to the abnormality determination method, whether the first information is abnormal can be determined based on the second information indicating the state of the second display device. Accordingly, even when the first information is incomplete, whether the first information is abnormal can be determined based on the second information indicating the state of the second display device.

(Appendix 2) The abnormality determination method according to appendix 1, in which the first display device displays the first portion in the first area by projecting the first portion toward the display area, and the second display device displays the second portion in the second area by projecting the second portion toward the display area.

According to the abnormality determination method, when the first display device and the second display device are projection devices and projection is performed on the same display area, whether the first information is abnormal can be determined.

(Appendix 3) The abnormality determination method according to appendix 1 or 2, further including: notifying a result of determining whether the first information is abnormal.

According to the abnormality determination method, a result of determining whether the first information is abnormal is notified. Accordingly, the result of determining whether the first information is abnormal can be known.

(Appendix 4) The abnormality determination method according to any one of appendixes 1 to 3, further including: complementing the first information based on the second information when the first information is not acquired.

According to the abnormality determination method, when the first information cannot be acquired, the first information can be complemented based on the second information. Accordingly, even when the first information cannot be acquired, the first information can be complemented.

(Appendix 5) The abnormality determination method according to any one of appendixes 1 to 4, further including: acquiring third information indicating a state of a third display device configured to display a third portion of the first image that is different from the first portion and the second portion in a third area of the display area that is different from the first area and the second area, in which the first information is determined to be abnormal when a difference between the second information and the third information is within a predetermined range and a difference between the first information and the second information exceeds a predetermined range.

According to the abnormality determination method, when the difference between the second information and the third information is within the predetermined range and the difference between the first information and the second information exceeds the predetermined range, it can be determined that the first information is abnormal. Accordingly, the reliability of the abnormality determination of the first information can be increased.

(Appendix 6) A control device that controls a first display device and a second display device, the control device including: a processor, in which the processor is configured to execute: acquiring first information indicating a state of the first display device configured to display a first portion of a first image in a first area of a display area that displays the first image, acquiring second information indicating a state of the second display device configured to display a second portion of the first image that is different from the first portion in a second area of the display area that is different from the first area, and determining whether the first information is abnormal based on the second information.

According to the control device, whether the first information is abnormal can be determined based on the second information indicating the state of the second display device. Accordingly, even when the first information is incomplete, whether the first information is abnormal can be determined based on the second information indicating the state of the second display device.

(Appendix 7) A non-transitory computer-readable storage medium storing a program, the program causing a processor to execute operations comprising: acquiring first information indicating a state of a first display device configured to display a first portion of a first image in a first area of a display area that displays the first image; acquiring second information indicating a state of a second display device configured to display a second portion of the first image that is different from the first portion in a second area of the display area that is different from the first area; and determining whether the first information is abnormal based on the second information.

According to this program, whether the first information is abnormal can be determined based on the second information indicating the state of the second display device. Accordingly, even when the first information is incomplete, whether the first information is abnormal can be determined based on the second information indicating the state of the second display device.

What is claimed is:
1. An abnormality determination method comprising:
   acquiring first information indicating a state of a first display device configured to display a first portion of a first image in a first area of a display area that displays the first image;
   acquiring second information indicating a state of a second display device configured to display a second portion of the first image that is different from the first portion in a second area of the display area that is different from the first area;
   complementing the first information based on the second information when the first information is not required; and
   determining whether the first information is abnormal based on the second information.
2. The abnormality determination method according to claim 1, wherein the first display device displays the first portion in the first area by projecting the first portion toward the display area, and the second display device displays the second portion in the second area by projecting the second portion toward the display area.

3. The abnormality determination method according to claim 1, further comprising:

notifying a result of determining whether the first information is abnormal.

4. The abnormality determination method according to claim 1, further comprising:

acquiring third information indicating a state of a third display device configured to display a third portion of the first image that is different from the first portion and the second portion in a third area of the display area that is different from the first area and the second area, wherein the first information is determined to be abnormal when a difference between the second information and the third information is within a predetermined range and a difference between the first information and the second information exceeds a predetermined range.

5. A control device that controls a first display device and a second display device, the control device comprising:

a processor, wherein the processor is configured to execute acquiring first information indicating a state of the first display device configured to display a first portion of a first image in a first area of a display area that displays the first image, acquiring second information indicating a state of the second display device configured to display a second portion of the first image that is different from the first portion in a second area of the display area that is different from the first area, complementing the first information based on the second information when the first information is not acquired, and determining whether the first information is abnormal based on the second information.

6. A non-transitory computer-readable storage medium storing a program, the program causing a processor to execute operations comprising:

acquiring first information indicating a state of a first display device configured to display a first portion of a first image in a first area of a display area that displays the first image;

acquiring second information indicating a state of a second display device configured to display a second portion of the first image that is different from the first portion in a second area of the display area that is different from the first area;

complementing the first information based on the second information when the first information is not required; and determining whether the first information is abnormal based on the second information.

7. The control device according to claim 5, wherein the first display device displays the first portion in the first area by projecting the first portion toward the display area, and the second display device displays the second portion in the second area by projecting the second portion toward the display area.

8. The control device according to claim 5, wherein the processor is further configured to execute:

notifying a result of determining whether the first information is abnormal.

9. The control device according to claim 5, wherein the processor is further configured to execute:

acquiring third information indicating a state of a third display device configured to display a third portion of the first image that is different from the first portion and the second portion in a third area of the display area that is different from the first area and the second area, wherein the first information is determined to be abnormal when a difference between the second information and the third information is within a predetermined range and a difference between the first information and the second information exceeds a predetermined range.

10. The control device according to claim 5, wherein determining whether the first information is abnormal based on the second information comprises determining if either the first information or the second information exceeds a management limit.

11. The control device according to claim 5, wherein determining whether the first information is abnormal based on the second information comprises determining if either the first information or the second information is missing data.

12. The non-transitory computer-readable storage medium of claim 6, wherein the operations further comprise:

the first display device displays the first portion in the first area by projecting the first portion toward the display area, and the second display device displays the second portion in the second area by projecting the second portion toward the display area.

13. The non-transitory computer-readable storage medium of claim 6, wherein the operations further comprise:

notifying a result of determining whether the first information is abnormal.

14. The non-transitory computer-readable storage medium of claim 6, wherein the operations further comprise:

acquiring third information indicating a state of a third display device configured to display a third portion of the first image that is different from the first portion and the second portion in a third area of the display area that is different from the first area and the second area, wherein the first information is determined to be abnormal when a difference between the second information and the third information is within a predetermined range and a difference between the first information and the second information exceeds a predetermined range.

15. The non-transitory computer-readable storage medium of claim 6, wherein determining whether the first information is abnormal based on the second information comprises determining if either the first information or the second information exceeds a management limit.

16. The non-transitory computer-readable storage medium of claim 6, wherein determining whether the first information is abnormal based on the second information comprises determining if either the first information or the second information is missing data.

17. The abnormality determination method according to claim 1, wherein determining whether the first information is abnormal based on the second information comprises determining if either the first information or the second information exceeds a management limit.

18. The abnormality determination method according to claim 1, wherein determining whether the first information is abnormal based on the second information comprises determining if either the first information or the second information is missing data.

\* \* \* \* \*